US012772010B2

(12) United States Patent
Klymko

(10) Patent No.: US 12,772,010 B2
(45) Date of Patent: Oct. 20, 2026

(54) EAR-WEARABLE DEVICE WITH MICROPHONE INLET DIVIDER

(71) Applicant: Starkey Laboratories, Inc., Eden Prairie, MN (US)

(72) Inventor: Viktor Klymko, Minneapolis, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 104 days.

(21) Appl. No.: 18/796,497

(22) Filed: Aug. 7, 2024

(65) Prior Publication Data

US 2025/0080923 A1 Mar. 6, 2025

Related U.S. Application Data

(60) Provisional application No. 63/534,922, filed on Aug. 28, 2023.

(51) Int. Cl.
*H04R 25/00* (2006.01)
*H04R 1/08* (2006.01)
*H04R 1/10* (2006.01)

(52) U.S. Cl.
CPC ............ *H04R 25/48* (2013.01); *H04R 1/083* (2013.01); *H04R 1/1016* (2013.01); *H04R 25/65* (2013.01)

(58) Field of Classification Search
CPC .... H04R 1/083; H04R 1/1016; H04R 1/1075; H04R 1/2884; H04R 25/48; H04R 25/60; H04R 25/65; H04R 2410/07
See application file for complete search history.

(56) References Cited

U.S. PATENT DOCUMENTS

| | | | | |
|---|---|---|---|---|
| 7,303,047 | B2 | 12/2007 | Gallagher | |
| 7,756,285 | B2 | 7/2010 | Sjursen | |
| 8,737,662 | B2 | 5/2014 | Zukowski | |
| 9,078,571 | B2 | 7/2015 | Bridger | |
| 9,537,985 | B2 | 1/2017 | Park | |
| 10,631,073 | B2 | 4/2020 | Schipper | |
| D989,319 | S | 6/2023 | Johnson | |
| 2008/0118096 | A1* | 5/2008 | De Pooter | H04R 1/086 381/359 |
| 2021/0099778 | A1* | 4/2021 | Hua | H04R 1/02 |
| 2021/0211816 | A1* | 7/2021 | Higgins | H04R 25/604 |
| 2023/0353964 | A1 | 11/2023 | Standish et al. | |
| 2025/0227403 | A1* | 7/2025 | Yamamoto | H04R 1/28 |

FOREIGN PATENT DOCUMENTS

| | | | |
|---|---|---|---|
| DK | 2893714 | T3 | 9/2017 |
| WO | WO 2007086360 | A1 | 8/2007 |

* cited by examiner

*Primary Examiner* — Paul W Huber
(74) *Attorney, Agent, or Firm* — Mueting Raasch Group

(57) ABSTRACT

An ear-wearable device includes a housing with a top shell and a bottom shell. A microphone inlet acoustically couples a first end of an acoustic pathway ambient air outside the housing. The microphone inlet is defined by a top surface of the top shell, a bottom surface of the bottom shell, and an opening in the top and/or bottom shell. A dividing member divides the microphone inlet. A top surface of the dividing member is in contact with or connected to the top surface of the microphone inlet. At least part of the bottom surface of the dividing member is in contact with or connected to the bottom surface of the bottom shell. A microphone is at a second end of the acoustic pathway and acoustically coupled to the acoustic pathway.

20 Claims, 10 Drawing Sheets

EAR-WEARABLE DEVICE WITH MICROPHONE INLET DIVIDER

RELATED APPLICATIONS

This application claims the benefit of U.S. Provisional Application No. 63/534,922, filed Aug. 28, 2023, the content of which is hereby incorporated by reference.

SUMMARY

This application relates generally to ear-level electronic systems and devices, including hearing aids, personal amplification devices, and hearables. In one embodiment, an ear-wearable device includes a housing with a top shell and a bottom shell. A groove is defined at an interface of the top and bottom shells. A microphone inlet acoustically couples the groove with a first end of an acoustic pathway within the housing between the top and bottom shells. The microphone inlet is defined by a top surface of the top shell, a bottom surface of the bottom shell, and an opening in the top and/or bottom shell. A dividing member divides the microphone inlet. A top surface of the dividing member is in contact with or connected to the top surface of the microphone inlet. At least part of the bottom surface of the dividing member is in contact with or connected to the bottom surface of the bottom shell. A microphone is at a second end of the acoustic pathway and acoustically coupled to the acoustic pathway.

In another embodiment, acoustically coupling, via a microphone inlet, air outside of a housing of an ear-wearable device with a first end of an acoustic pathway within the housing. The microphone inlet is divided via a dividing member to break a uniform pressure front across the microphone inlet and provide a local pressure relief built on a first part of the microphone inlet to be released to a second part of the microphone inlet. A microphone is acoustically coupled at a second end of the acoustic pathway and signals from the microphone are used to reproduce sound into an ear canal of a user of the ear-wearable device.

The figures and the detailed description below more particularly exemplify illustrative embodiments.

BRIEF DESCRIPTION OF THE DRAWINGS

The discussion below makes reference to the following figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments disclosed herein are directed to an ear-worn or ear-level electronic hearing device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as "hearing aids," "hearing devices," and "ear-wearable devices"), such as hearables (e.g., wearable earphones, ear monitors, and earbuds), hearing aids, hearing instruments, and hearing assistance devices, typically include an enclosure, such as a housing or shell, within which internal components are disposed.

Embodiments described herein relate to apparatuses and methods for reducing ultrasonic interference with a microphone of an ear-wearable device. In subjective testing and acoustic measurements, some microphones have exhibited susceptibility to wind noise, even when separated from the wind by an elongated acoustic channel. This susceptibility can be location specific, e.g., a microphone at one end of the hearing device may be more susceptible than the same type of microphone at another location within the same enclosure. Simulations have shown that shows that steady wind flow causes ultrasonic resonance along a microphone acoustic path. The ultrasonic peak effectively increases microphone sensitivity in this frequency range. This can also make the hearing device sensitive to noise generated by other ultrasonic acoustic field sources such as motion detectors.

A solution is proposed herein based on this analysis and tested experimentally that would reduce ultrasonic sensitivity and ultrasonic noise in certain microphone configurations. In various embodiments, a dividing member (e.g., wall, partition) is added that separates the microphone port opening into two portions. This reduces the ultrasonic peak and spreads the acoustic energy more evenly across the spectrum. Simulations confirm that the amplitude of ultrasonic signals can be reduced between 17% and 30% at the frequencies where motion detectors operate.

Figure 1:
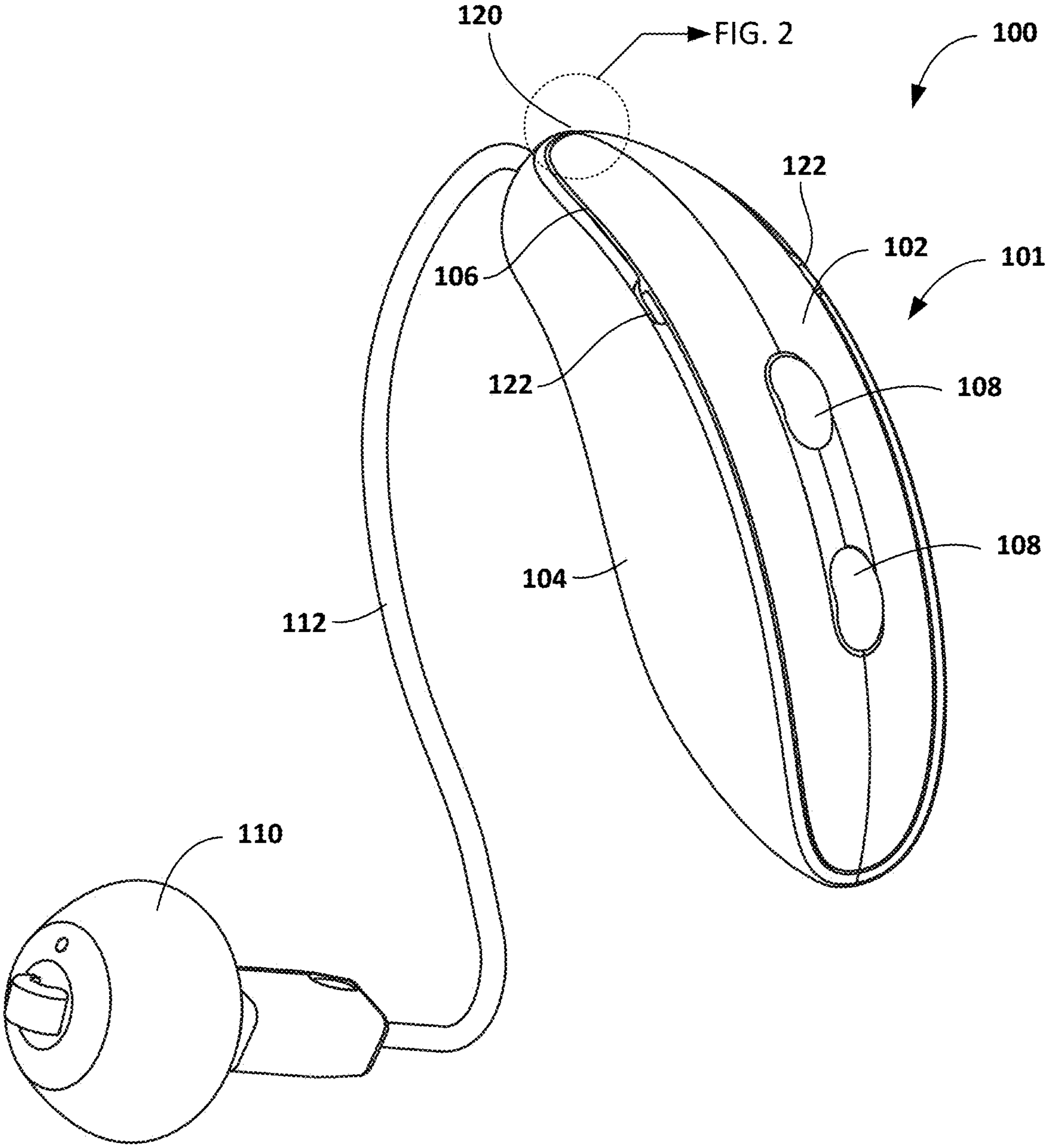
FIG. 1 is a perspective view of an ear-wearable device according to an example embodiment.

In FIG. 1, a perspective view illustrates an ear-wearable device 100 according to an example embodiment. The ear-wearable device 100 in the embodiment of FIG. 1 is a behind-the-ear (BTE) type device and thus and includes a housing 101 that is operable to be worn on or behind an ear of a wearer. The housing 101 is configured rest against a user's outer ear in a behind-the-ear orientation. The housing 101 can be manufactured by, for example, injection-molding, 3D printing, etc. The housing 101 may be formed from, for example, silicone, urethane, acrylates, flexible epoxy, acrylated urethane, and combinations thereof. The housing 101 includes a top shell 102 and a bottom shell 104. In some embodiments, the top shell 102 is removably attached to the bottom shell 104 by means of any of adhesive, a snap fit, press fit, a pin connection, fasteners, or the like.

For purposes of this disclosure, the terms "top," "bottom," "above," "below," "front," "back," etc., when reference the shells 102, 104 and other parts of the device 100 are not intended to indicate a required orientation of use relative to the ground or other reference point. Generally, these terms are intended to help distinguish locations relative to an arbitrary reference point and may correspond to the orientation in the drawings, but no limitation is intended by the use of these terms.

In various embodiments, the ear-wearable device 100 can include user input devices 108. In the example of FIG. 1, the user input devices 108 are disposed on the top shell 102 of the housing 101, but other placements are of the user input device are possible. The user input device 108 may include buttons, switches, or the like, such as a first button and a second button. The user can interact with the user input device 108 (e.g., by pressing one or more buttons) to adjust the volume, change one or more settings, or turn the ear-wearable device on or off.

An in-ear receiver portion 110 is coupled to the housing via a cable 112. The receiver portion 110 has a loudspeaker or similar audio transducer that reproduces sound into the user's ear canal. This configuration is referred to as receiver-in-canal (RIC). Note that the features described herein, while shown implemented in a RIC device, are applicable to other configurations, such as in-the-canal (ITC) types of devices, in which the receiver is integrated into a housing that fits in the ear canal. In such device, the housing (which holds at least one externally-facing microphone) may be hidden in the canal or the housing have a visible part in the outer ear extending from the ear canal.

The top and bottom shells 102, 104 form an enclosure that, once assembled, holds electronic components. A groove 106 is defined by an interface between the assembled top and bottom shells 102, 104. In this example the groove 106 extends around a periphery of the top shell 102 and bottom shell 104. The groove 106 provides locations in which ports, inlets, and the like can be placed for allowing air to enter within the housing 101.

The housing 101 includes at least one microphone inlet 120 acoustically coupled to the groove 106, e.g., forming part of air passageway from the outside of the housing 101 to an inside of the housing 101. In some embodiments, the groove 106 need not extend along the periphery of the shells 102, 104, e.g., may be a slot, port, gap, or other feature that allows air to flow between the shells 102, 104 proximate the microphone inlet 120. The microphone inlet 120 provides an air passageway from the ambient environment to within the housing 101.

The housing 101 may also include additional microphone inlets for additional microphones, as indicated by microphone inlets 122, which are sometimes referred to as rear microphone inlets that acoustically couple outside air to a rear microphone (not shown). In such an arrangement, the other microphone inlet 120 may be referred to as a front microphone inlet and acoustically couples outside air to a front microphone (e.g., microphone 300 in FIG. 3). Features of microphone inlet 120 are described below, and these features can be used in other microphone inlets, such as inlets 122. Further, as noted above, the groove 106 that is coupled to multiple microphone inlets may be implemented as two or more separate slots, ports, or the like that are individually located over the inlets 120, 122 instead of being a continuous, peripheral, groove as shown in the figures.

Figure 2:
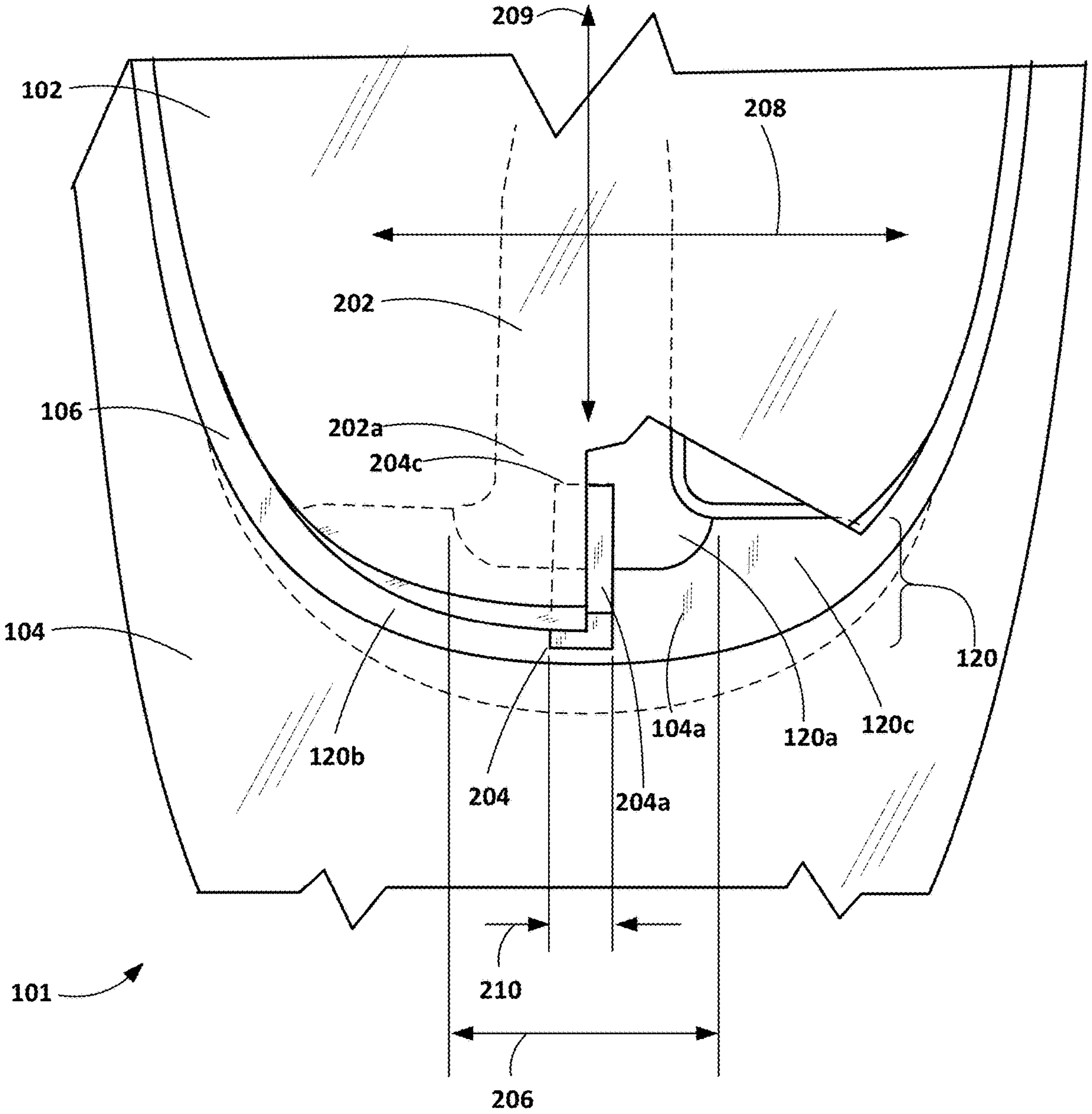
FIG. 2 is a partial cutaway view of the hearing device shown in FIG. 1.
Figure 3:
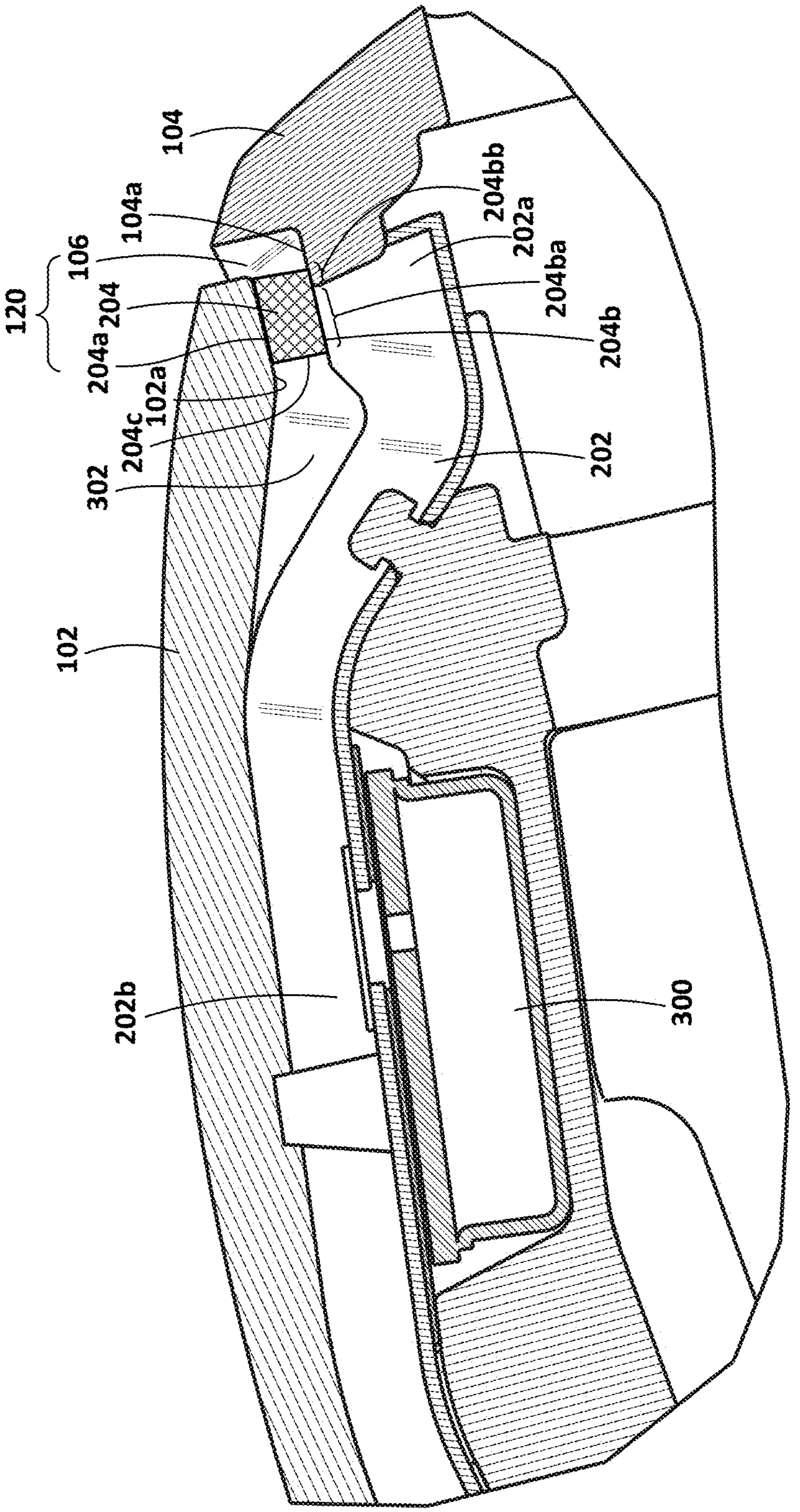
FIGS. 3-5 are cross-sectional views of the hearing device shown in FIG. 1.
Figure 4:
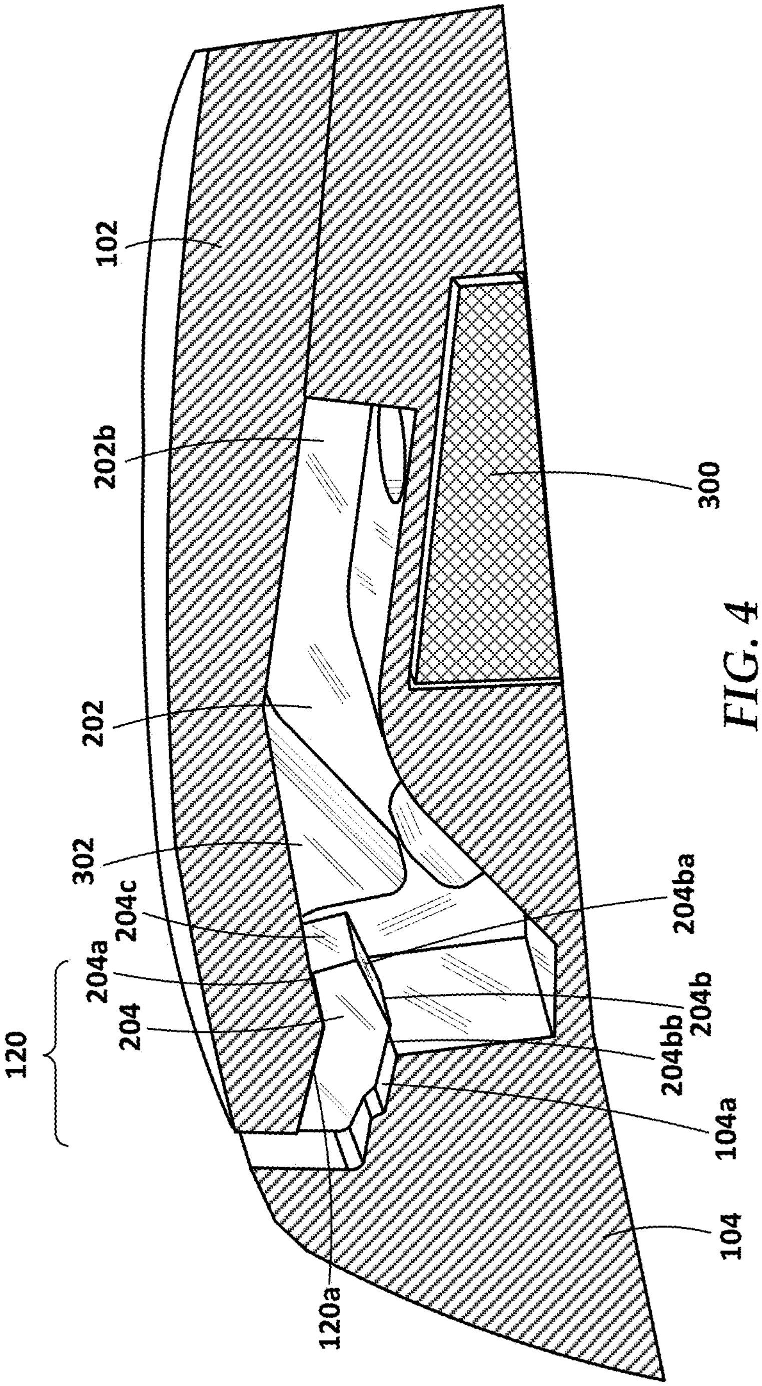

In FIG. 2 a partial cutaway view shows details of the microphone inlet 120 shown in FIG. 1. In FIGS. 3 and 4, cross-sectional views show additional details of the microphone inlet 120 and adjoining parts. As best seen in FIG. 2, the microphone inlet 120 acoustically couples the groove 106 with a first end **202*a* of an acoustic pathway 202 within the housing 101. The microphone inlet 120 is defined by top surface 102*a* (see FIGS. 3 and 4) of the top shell 102, bottom surface 104*a* of the bottom shell 104, and an opening 120*a* in the bottom shell 104. In some embodiments, the opening 120*a* be instead or in addition in the top shell 102. As seen in this figure, air can flow between the outside of the housing 101 and into/out of the acoustic pathway 202 via the opening 120*a* and a gap between the surfaces 102*a*, 104*a***.

A dividing member 204 divides the microphone inlet 120. A top surface **204*a* of the dividing member 204 is in contact with or connected to the top surface 102*a* of the microphone inlet 120. The top surface 204*a* of the dividing member 204 adjoins the top surface 102*a* of the top shell 102. As best seen in FIG. 3, a first part 204*ba* of the bottom surface 204*b* of the dividing member 204 may be exposed within the acoustic pathway 202 and a second part 204*bb* of the bottom surface 204*b* of the dividing member 204 may be in contact with or connected to the bottom surface 104*a*. In other embodiments, there may be no parts of the bottom surface 204*b* exposed within the acoustic pathway 202, e.g., the dividing member's top and bottom surfaces 204*a*, 204*b* may be completely covered by the top and bottom shells 102, 104. A distal end 204*c* of the dividing member 204 is exposed within the acoustic pathway 202**.

Note that the dividing member 204 may be formed integrally with one of the top or bottom shells 102, 104. In such a case, the top surface **204*a* or part 204*bb* of the bottom surface 204*b* may be virtual surfaces, e.g., defined geometrically by intersecting corners of the dividing member 204 and the respective surface 204*a*, 204*b* but not exposed on the outside of the part. The top surface 204*a* or surface part 204*bb* that are not formed integrally with either the top or bottom shells 102, 104 will be exposed when the shells 102, 104 are separated, but will be hidden once the shells 102, 104 are assembled to form the housing 101. Thus the term "in contact or connected" with the surfaces 102*a*, 104*a* are meant to indicate that the respective surface 204*a* or surface part 204*bb* may be exposed on a disassembled state or formed integrally with the shells. The dividing member 204 may also be formed separately from either of the shells 102, 104, being attached therebetween during assembly, e.g., being bonded to one of the shells 102, 104** before assembly, held in place by an interference fit, etc.

The dividing member 204 breaks a uniform pressure front across the microphone inlet 120 and provides a local pressure relief built on a first part **120*b* of the microphone inlet 120 to be released to a second part 120*c* of the microphone inlet 120. Note that this pressure relief works in both directions, e.g., pressure relief built on the second part 120*c* can also be released to the first part 120*b*, such that the designation of first and second parts 120*b*, 120*c* in FIG. 2 is arbitrary for this purpose and function. As will be described further below, the dividing member 204 can reduce an ultrasonic peak (e.g., at or above 16-30 kHz, and in some cases at least above 20 kHz) detected at the microphone 300** by spreading acoustic energy across a wider frequency spectral range than the ultrasonic peak.

As best seen in FIG. 2, the dividing member 204 is approximately in the middle of the microphone inlet 120, such that the parts **120*b*, 120*c* are roughly the equal in size. The dividing member 204 may be located elsewhere in the microphone inlet 120, e.g., shifted to the left or the right by some amount such that the parts 120*b*, 120*c* are substantially unequal in size. So long as the smallest of the inlet parts 120*b*, 120*c* in such an embodiment has sufficient flow area to provide air pressure relief to the other part, a different location of the dividing member 204** can still provide the indicated pressure relief in some configurations.

The microphone inlet 120 has an opening width 206 along a minor axis 208 of the acoustic pathway 202. The acoustic pathway 202 also has a major axis 209 and another vertical axis (see vertical axis 504 in FIG. 5) that is normal to (e.g., at a right angle to) both the minor axis 208 and the major axis 209. Generally, the minor axis 208 is aligned with the surfaces 102*a*, 104*a* that define part of the microphone inlet 120 and is normal the major axis 209. The dividing member 204 is also aligned with the major axis 209 in this example, however in other embodiments may be at a non-zero angle to the major axis 209.

The dividing member 204 has a blocking width 210 along the minor axis 208. In some embodiments the blocking width is between 20% and 40% of the opening width 206. In other embodiments, the blocking width may be less or more than this, with a practical lower value being the minimum manufacturable size defined by the process used to form the shells 102, 104 and/or related parts of the housing 101. In one embodiment, the opening width is at least 0.004 inches and the blocking width is 0.001 inches or less.

The acoustic pathway 202 is designed to acoustically couple sound from outside the ear-wearable device 100 to a microphone 300, as seen in FIGS. 3 and 4. The microphone 300 is at a second end 202*b* of the acoustic pathway 202 opposite the first end 202*a*. Also seen in FIGS. 3 and 4 the acoustic pathway 202 is a restriction 302 in width along the minor axis 208 of the acoustic pathway 202 at the first end 202*a*. The restriction 302 is proximate the distal end 204*c* of the dividing member 204. The restriction 302 may include symmetric parts on either side of the acoustic pathway 202, only one of the restrictions 302 being seen in these views.

Figure 5:
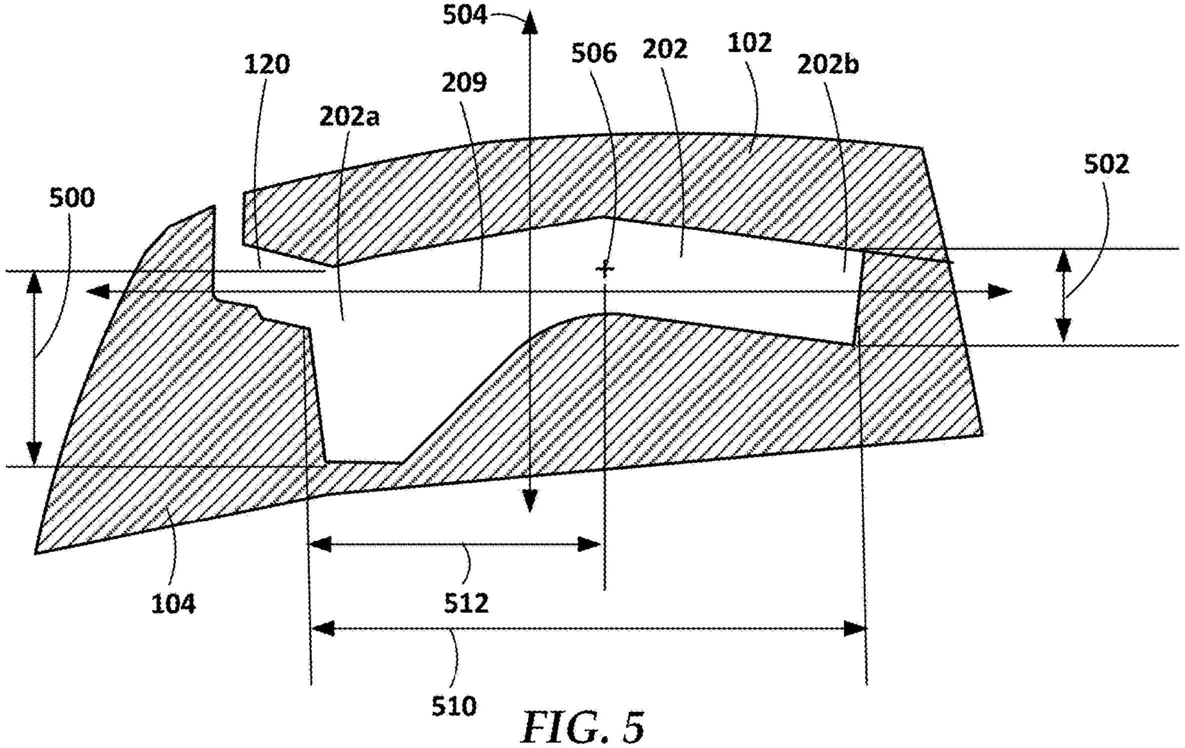

In FIG. 5, a cross sectional view shows additional details of the acoustic pathway 202 according to various embodiments. The first end 202*a* of the acoustic pathway 202 has a first dimension 500 from the top shell 102 to the bottom shell 104. The second end 202*b* of the acoustic pathway 202 has a second dimension 502 from the top shell 102 to the bottom shell 104. The first dimension 500 is larger than the second dimension 502. In one embodiment, the first dimension 500 may be around 0.004 inches and the second dimension 502 may be around 0.002 inches. For purposes of this disclosure, the term "around" when describing dimensions generally refers to + or −20%.

The acoustic pathway 202 tapers from the first dimension 500 to the second dimension 502 at a mid-point 506 between the first end 202*a* and the second end 202*b*. The acoustic pathway 202 may have a substantially constant cross sectional shape normal to its major axis 209 from the mid-point 506 to the second end 202*b*. This is in contrast to the first end 202*a*, which has a cone-like or horn-like taper. A wide end of the taper faces the microphone inlet 120.

The mid-point 506 may be at a half-distance of the acoustic pathway 202 along the major axis 209 or may be closer to one of the ends 202*a*, 202*b*. In one embodiment, a distance 512 from the mid-point 506 to the first end 202*a* of the acoustic pathway 202 is between 40% and 60% of a total length 510 of the acoustic pathway 202. In various embodiments, the distance 512 may be around 0.007 inches and the total length 510 may be around 0.015 inches.

Note that in FIG. 3 the dividing member 204 is shown as an elongated cuboid and in FIG. 4 the dividing member is shown as a union of two cuboids at different angles, such that the dividing member 204 conforms to an internal profile of the top shell 102. Either of these configurations may be used without departing from the scope of this disclosure. Further, FIGS. 6A-6D and 7A-7D show additional variations of a dividing member according to various embodiments.

Figure 6A:
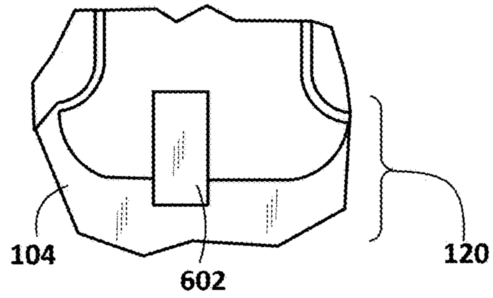
FIGS. 6A-6D are top views of dividing members according to example embodiments.
Figure 6B:
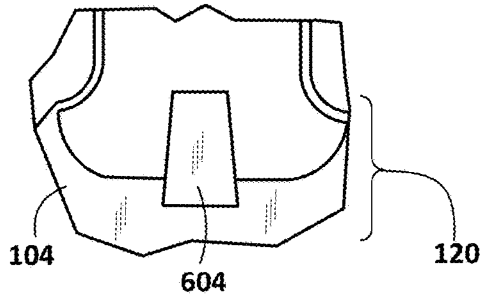
Figure 6C:
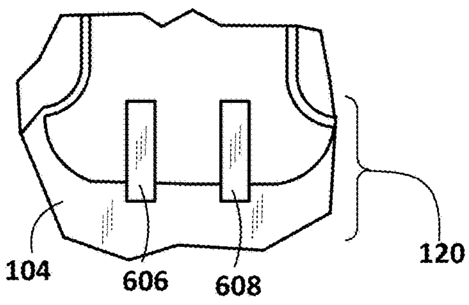
Figure 6D:
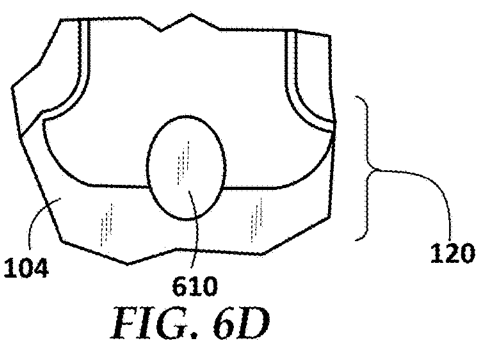

In FIGS. 6A-6D, top views show different arrangements and shapes of dividing members according to various embodiments. In FIG. 6A, a dividing member 602 is shown offset from center of the microphone inlet 120. In FIG. 6B, a dividing member 604 has a non-uniform cross section along the major axis 209. In FIG. 6C, two dividing members 606, 608 are used. In this example, the dividing members 606, 608 have the same shape, but they may each have different shapes in other embodiments. In FIG. 6D, a dividing member 610 has a round top profile shape, e.g., a circle or ellipse. The embodiments in FIGS. 6A-6D may be combined, e.g., any of the illustrated shapes may be offset from center, the two dividing members 606, 608 may have any shape, different shapes from each other, and/or may be non-uniformly distributed from left to right in the figure, etc.

Figure 7A:
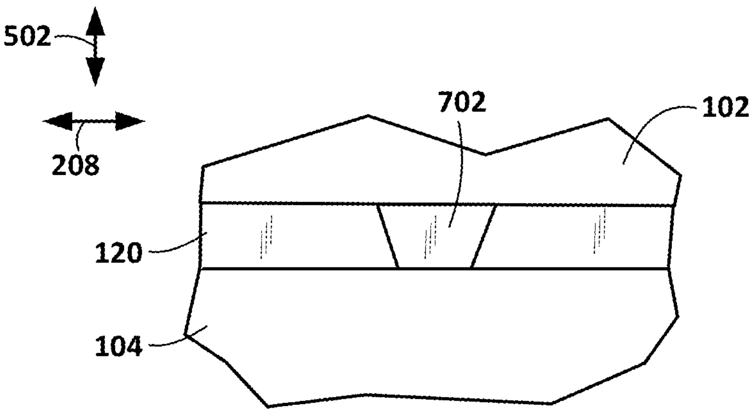
FIGS. 7A-7D are end views of dividing members according to example embodiments.
Figure 7B:
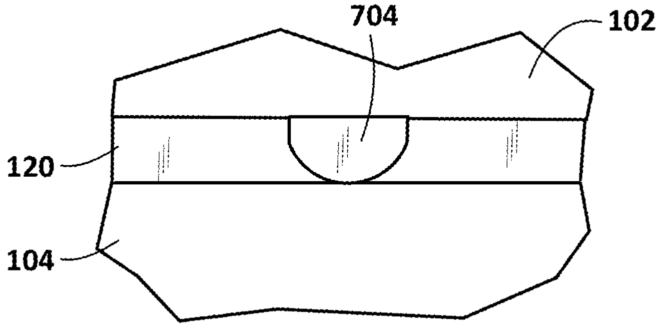
Figure 7C:
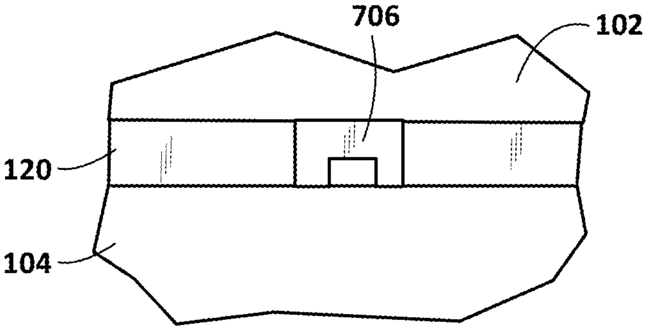
Figure 7D:
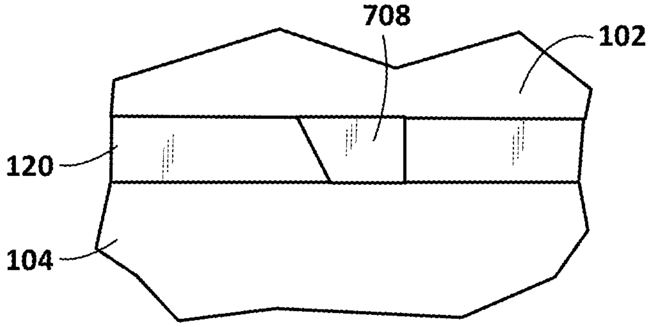

In FIGS. 7A-7D, end views show different arrangements and shapes of dividing members according to various embodiments. In FIG. 7A, a dividing member 702 has a trapezoidal cross section. In FIG. 7B, a dividing member 704 has a half circular lower edge profile. In FIG. 7C, a dividing member 706 has a convex lower edge profile. In FIG. 7D, a dividing member 708 has a non-symmetric cross section. The embodiments in FIGS. 7A-7D may be combined with each other and with the variations shown in FIGS. 6A-6D. The feasibility of certain shapes may depend on the process and whether the dividing member is formed integrally with one of the top and bottom shells 102, 104. For example, an injection molding process may have a draft angle requirement that drives feature shapes. Similarly, while 3D printing is more flexible than injection molding, 3D printing processes may have maximum overhang limits.

Figure 8:
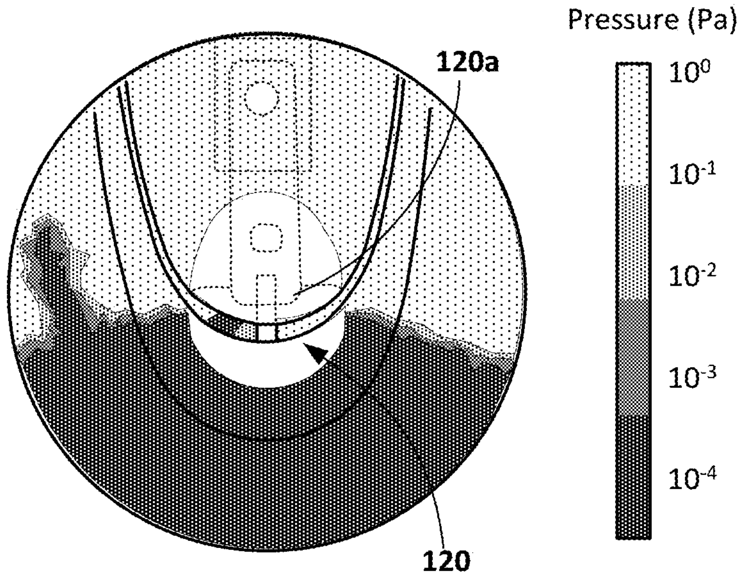
FIGS. 8 and 9 are plots of simulation results for a microphone port according to various example embodiments.

In FIG. 8, a plot shows a finite element simulation of sound pressure at a microphone inlet 120 due to incoming wind with 3 m/s speed. A time-domain simulation of pressure build-up in the microphone inlet 120 due to incoming wind shows that the pressure is not symmetric at times, because of the chaotic nature of the wind flow. There are moments within the wind impact when the pressure on the left side of the microphone inlet opening is orders of magnitude different from the pressure on its right side, as shown in FIG. 8. Changes in the pressure distribution occur rapidly despite steady 3 m/s wind flow in the major axis direction, and these fast oscillations can generate internal noise at ultrasonic frequencies.

Figure 9:
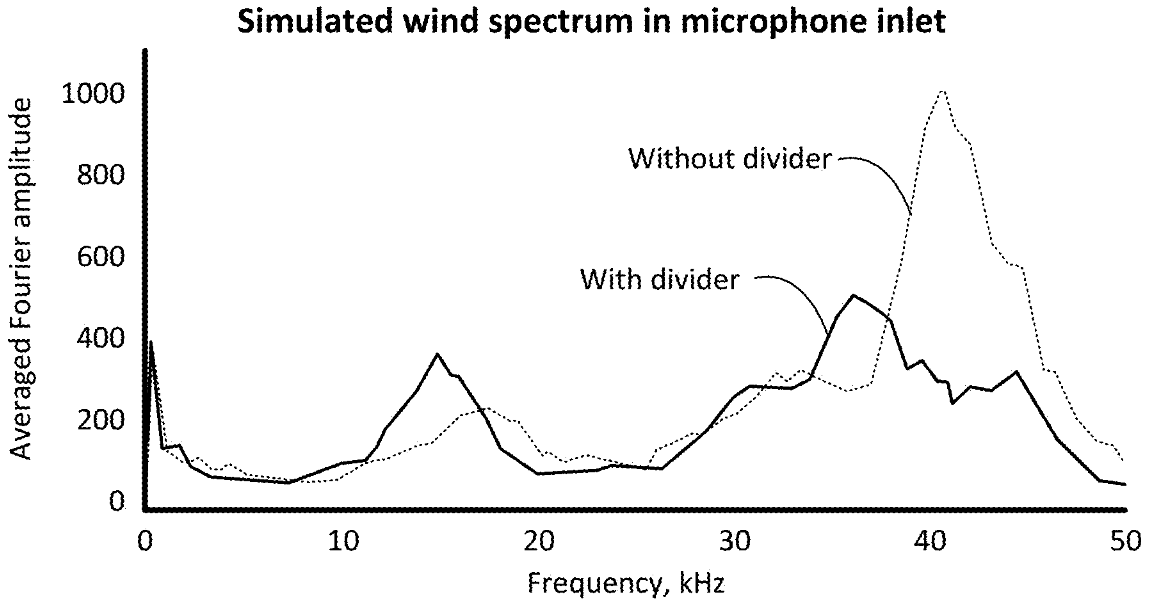

Ain FIG. 9, a graph shows results of a fast Fourier transform (FFT) of the simulated pressure at the microphone for a similar design with the dividing member (solid line) and without the dividing member (dotted line). An initial 0.4 ms of the simulation time are excluded from the data prior to FFT in order to reduce numeric noise. A sliding 12-point average is further applied to the FFT spectra for clarity.

The results in FIG. 9 show that high amplitude 40 kHz ultrasonic component is present in the pressure in the inlet without the divider, but this peak is reduced and shifted down in frequency with implementation of the divider within the inlet. High amplitude ultrasound poses the risk of microphone clipping (e.g., membrane hitting the retainer inside the microphone). Further, high amplitude ultrasound can result in broadband noise, which may be perceived as "wind noise". Frequency downshift with the divider in place indicates that the acoustic system stiffness is reduced, and the pressure relief is working.

The trade-off for reducing 40 kHz peak is the increase of 15 kHz peak amplitude, which is the natural resonance of the microphone inlet cavity. With the divider introduced, the cavity becomes more occluded, and its natural resonance increases. However, this increase is not as negatively impactful as compared to the positive impact of the reduction at 40 kHz, thus the overall risk diminishes. Various design parameters, e.g., divider dimensions, shape, and location, may be selected to diminish or move the 15 kHz peak, and/or can be dealt with using signal processing.

Figure 10:
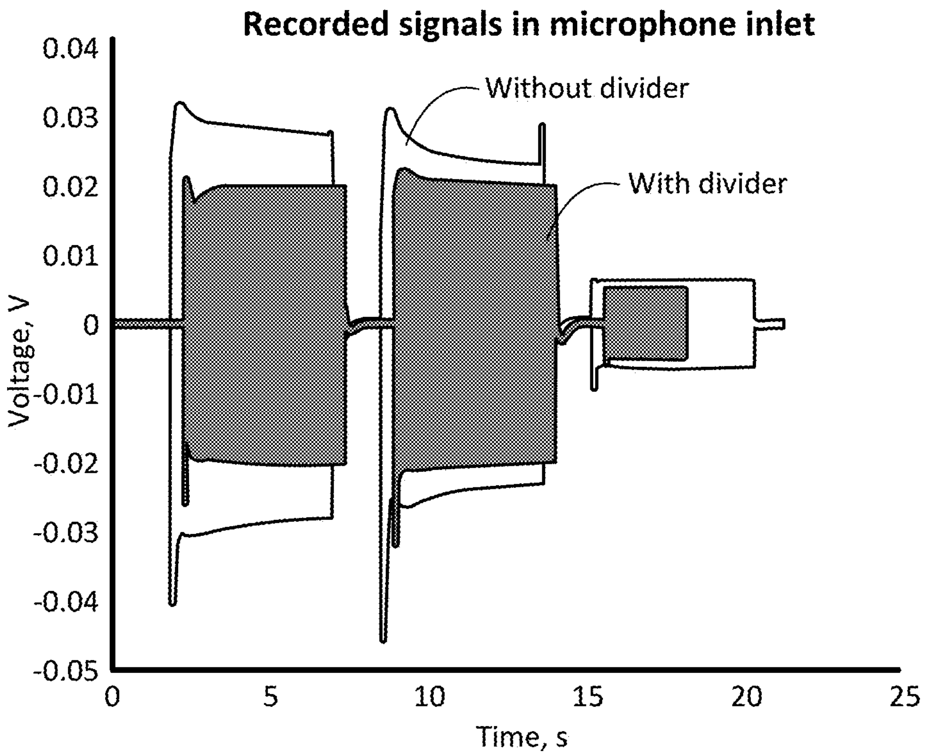
FIGS. 10 and 11 are plots of experimental results for a microphone port according to various example embodiments.
Figure 11:
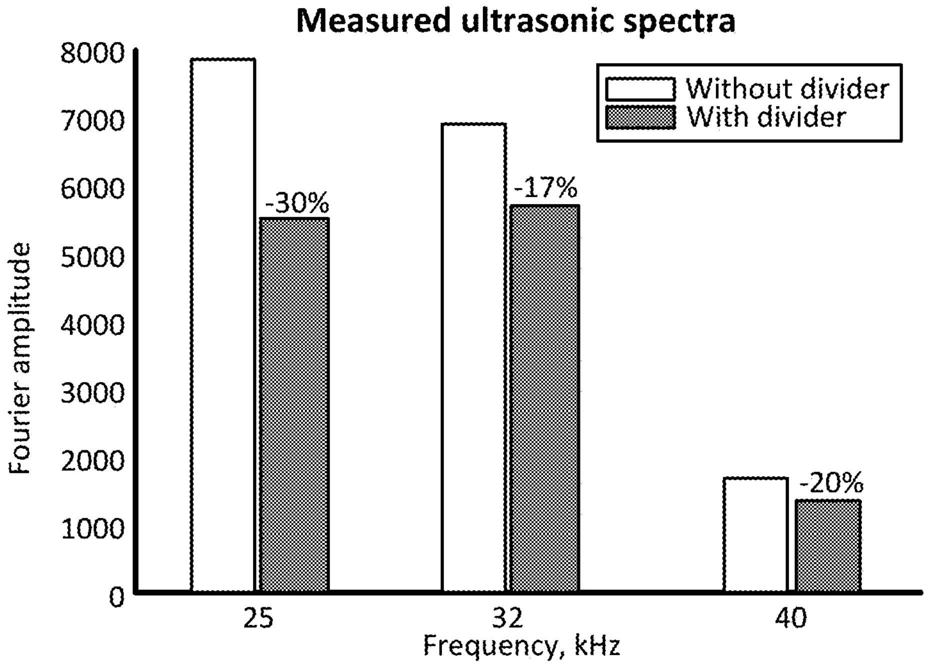

In FIGS. 10 and 11, graphs show experimental results for a hearing device according to an example embodiment. For experimental testing of ultrasonic sensitivity mitigation, a housing with an extended dividing member was designed and 3D printed with the geometry seen in FIG. 4. A microphone module was exposed to bursts of ultrasonic frequencies typical for motion sensors, e.g., 25 kHz, 32 kHz, and 40 kHz. The sound pressure level (SPL) at port location at these frequencies was measured with a laboratory microphone and reached 120 dB at peak. In this experiment, there was no wind. The time-domain signals were recorded from the ear-wearable device with and without the divider in the acoustic path. The prototype with the wall delivers consistent reduction of ultrasonic signal amplitudes, as shown in the time-domain amplitude plots in FIG. 10.

An FFT was applied to the recorded signals to decompose their spectra and compare their relative amplitudes. In the prototype with dividing member, the amplitudes of the Fourier components are reduced by 30% at 25 kHz, 17% at 32 kHz, and 20% at 40 kHz, as shown in FIG. 11. At the same time, no additional Fourier components are detected in either in the microphone inlet with or without the dividing member. This indicates that no additional harmonic generation occurs. There is some reduction of low frequency components below 100 Hz. In simple terms, the microphone does not "clip," e.g., it stays in linear operation despite 120 dB ultrasound pressure. For this reason, the ultrasonic noise does not become audible and is not detected at audible frequencies directly.

Figure 12:
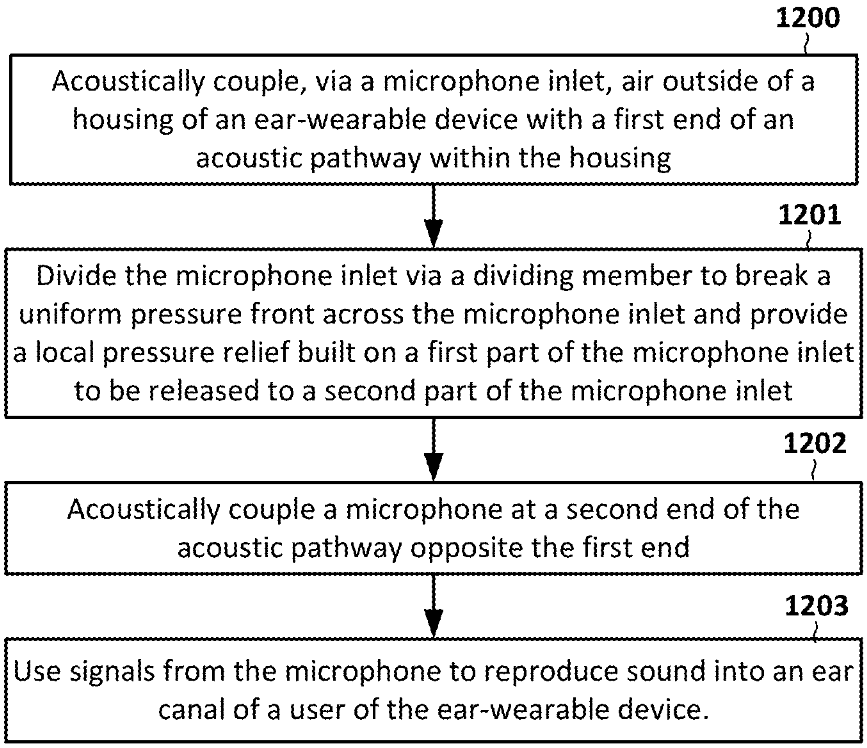
FIG. 12 is a flowchart of a methods according to an example embodiments.
Figure 13:
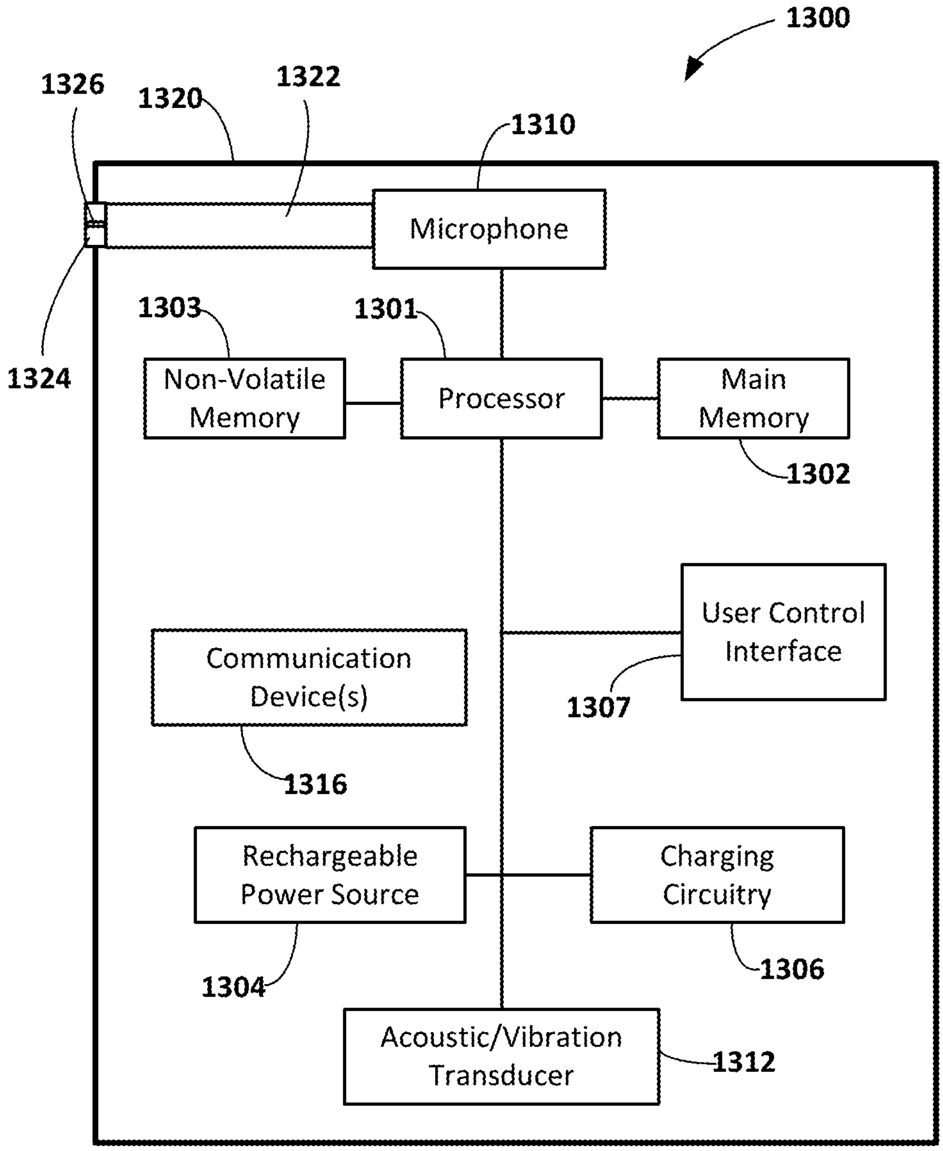
FIG. 13 is a block diagram of a hearing device and system according to an example embodiment.

In FIG. 12, a flowchart shows a method according to an example embodiment. The method involves acoustically coupling 1200, via a microphone inlet, air outside of a housing of an ear-wearable device with a first end of an acoustic pathway within the housing. The microphone inlet is divided 1201 via a dividing member to break a uniform pressure front across the microphone inlet and provide a local pressure relief built on a first part of the microphone inlet to be released to a second part of the microphone inlet. A microphone is acoustically coupled 1202 at a second end of the acoustic pathway and signals from the microphone are used 1203 to reproduce sound into an ear canal of a user of the ear-wearable device In FIG. 13, a block diagram illustrates a system and ear-worn hearing device 1300 in accordance with any of the embodiments disclosed herein. The hearing device 1300 includes a housing 1320 configured to be worn in, on, or about an ear of a wearer. The hearing device 1300 shown in FIG. 13 can represent a single hearing device configured for monaural or single-ear operation or one of a pair of hearing devices configured for binaural or dual-ear operation. Various components are situated or supported within or on the housing 1320. The housing 1320 can be configured for deployment on a wearer's ear (e.g., a behind-the-ear device housing), within an ear canal of the wearer's ear (e.g., an in-the-ear, in-the-canal, invisible-in-canal, or completely-in-the-canal device housing) or both on and in a wearer's ear (e.g., a receiver-in-canal or receiver-in-the-ear device housing).

The hearing device 1300 includes a processor 1301 operatively coupled to a main memory 1302 and a non-volatile memory 1303. The processor 1301 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 1301 can include or be operatively coupled to main memory 1302, such as RAM (e.g., DRAM, SRAM). The processor 1301 can include or be operatively coupled to non-volatile (persistent) memory 1303, such as ROM, EPROM, EEPROM or flash memory.

The hearing device 1300 includes an audio processing facility operably coupled to, or incorporating, the processor 1301. The audio processing facility includes audio signal processing circuitry (e.g., analog front-end, analog-to-digital converter, digital-to-analog converter, DSP, and various analog and digital filters), a microphone arrangement 1310, and an acoustic/vibration transducer 1312 (e.g., loudspeaker, receiver, bone conduction transducer, motor actuator). The acoustic transducer 1312 produces amplified sound inside of the ear canal. The microphone arrangement 1310 can include one or more discrete microphones or a microphone array(s) (e.g., configured for microphone array beamforming). Each of the microphones of the microphone arrangement 1310 can be situated at different locations of the housing 1320. It is understood that the term microphone used herein can refer to a single microphone or multiple microphones unless specified otherwise.

At least one of the microphones 1310 may be configured as a reference microphone producing a reference signal in response to external sound outside an ear canal of a user. Generally, at least one the reference microphones 1310 (also referred to as an externally facing microphones) is acoustically coupled to ambient air outside the housing 1320 via an acoustic pathway 1322 and a microphone inlet 1324 (also referred to as a microphone port, orifice, void, opening, etc.). The microphone inlet 1324 allows air to pass between two parts of the housing 1320, or may be formed within one part of the housing 1320. A dividing member 1326 divides the microphone inlet 1324 to break a uniform pressure front across the microphone inlet 1324 and provide a local pressure relief built on a first part of the microphone inlet to be released to a second part of the microphone inlet.

The hearing device 1300 may also include a user control interface 1307 operatively coupled to the processor 1301. The user control interface 1307 is configured to receive an input from the wearer of the hearing device 1300. The input from the wearer can be any type of user input, such as a touch input, a gesture input, or a voice input. The user control interface 1307 may be configured to receive an input from the wearer of the hearing device 1300.

The hearing device 1300 can include one or more communication devices 1316. For example, the one or more communication devices 1316 can include one or more radios coupled to one or more antenna arrangements that conform to an IEEE 802.13 (e.g., Wi-Fi®) or Bluetooth® (e.g., BLE, Bluetooth® 4.2, 5.0, 5.1, 5.2 or later) specification, for example. In addition, or alternatively, the hearing device 1300 can include a near-field magnetic induction (NFMI) sensor (e.g., an NFMI transceiver coupled to a magnetic antenna) for effecting short-range communications (e.g., ear-to-ear communications, ear-to-kiosk communications). The communications device 1316 may also include wired communications, e.g., universal serial bus (USB) and the like.

The hearing device 1300 also includes a power source, which can be a conventional battery, a rechargeable battery (e.g., a lithium-ion battery), or a power source comprising a supercapacitor. In the embodiment shown in FIG. 13, the hearing device 1300 includes a rechargeable power source 1304 which is operably coupled to power management circuitry for supplying power to various components of the hearing device 1300. The rechargeable power source 1304 is coupled to charging circuity 1306. The charging circuitry 1306 is, for example, electrically coupled to charging contacts on the housing 1320 which are configured to electrically couple to corresponding charging contacts of a charging unit when the hearing device 1300 is placed in the charging unit.

This document discloses numerous example embodiments, including but not limited to the following:

Example 1 is a an ear-wearable device comprising: a housing comprising a top shell and a bottom shell, a groove being defined at an interface of the top and bottom shells; a microphone inlet acoustically coupling the groove with a first end of an acoustic pathway within the housing between the top and bottom shells, the microphone inlet defined by a top surface of the top shell, a bottom surface of the bottom shell, and an opening in one at least one of the top shell and the bottom shell; a dividing member dividing the microphone inlet, a top surface of the dividing member being in contact with or connected to the top surface of the microphone inlet, and at least part of the bottom surface of the dividing member being in contact with or connected to the bottom surface of the bottom shell; and a microphone at a second end of the acoustic pathway and acoustically coupled to the acoustic pathway.

Example 2 includes the ear-wearable device of example 1, wherein the dividing member breaks a uniform pressure front across the microphone inlet and provides a local pressure relief built on a first part of the microphone inlet to be released to a second part of the microphone inlet. Example 3 includes the ear-wearable device of example 1 or 2, wherein the dividing member reduces an ultrasonic peak detected at the microphone and spreads acoustic energy across a wider frequency spectral range than the ultrasonic peak. Example 4 includes the ear-wearable device of example 3, wherein the ultrasonic peak is at or above 20 KHz.

Example 5 includes the ear-wearable device of any one of examples 1-4, wherein the dividing member reduces a sensitivity of the microphone to an ultrasonic field generated by external motion sensors. Example 6 includes the ear-wearable device of any one of examples 1-5, wherein a first part of the bottom surface of the dividing member is exposed within the acoustic pathway and a second part of the bottom surface of the dividing member is in contact with or connected to the bottom surface of the bottom shell. Example 7 includes the ear-wearable device of any one of examples 1-6, wherein a distal end of the dividing member is exposed within the acoustic pathway.

Example 8 includes the ear-wearable device of any one of examples 1-7, wherein the first end of the acoustic pathway has a first dimension from the top shell to the bottom shell and the second end of the acoustic pathway has a second dimension from the top shell to the bottom shell, the first dimension being larger than the second dimension. Example 9 includes the ear-wearable device of example 8, wherein the acoustic pathway tapers from the first dimension to the second dimension at a mid-point between the first end and the second end and wherein the acoustic pathway has a substantially constant cross sectional shape normal to its major axis from the mid-point to the second end. Example 10 includes the ear-wearable device of example 9, wherein a distance from the mid-point to the first end of the acoustic pathway is between 40% and 60% of a total length of the acoustic pathway.

Example 11 includes the ear-wearable device of any one of examples 1-10, wherein the opening of the microphone inlet has an opening width along a minor axis of the acoustic pathway and the dividing member has a blocking width along the minor axis, the blocking width being between 20% and 40% of the opening width. Example 12 includes the ear-wearable device of example 11, wherein the opening width is at least 0.004 inches and the blocking width is 0.001 inches or less.

Example 13 includes the ear-wearable device of any previous example, wherein the acoustic pathway comprises a restriction in width along a minor axis of the acoustic pathway at the first end, the restriction proximate a distal end of the dividing member. Example 14 includes the ear-wearable device of any previous example, wherein the housing is configured to rest against a user's outer ear, the ear-wearable device further comprising a receiver portion configured for placement in an ear canal of the user. Example 15 includes the ear-wearable device of any previous example, wherein the dividing member divides the opening of the microphone inlet into equal portions.

Example 16 includes the ear-wearable device of any previous example, wherein the microphone inlet comprises a front microphone inlet and the microphone comprises a front microphone, the ear-wearable device further comprising: one or more rear microphone inlets acoustically coupling the groove with a first end of a rear acoustic pathway within the housing; and a rear microphone at a second end of the rear acoustic pathway and acoustically coupled to the rear acoustic pathway.

Example 17 is a method, comprising: acoustically coupling, via a microphone inlet, air outside of a housing of an ear-wearable device with a first end of an acoustic pathway within the housing; dividing the microphone inlet via a dividing member to break a uniform pressure front across the microphone inlet and provide a local pressure relief built on a first part of the microphone inlet to be released to a second part of the microphone inlet; acoustically coupling a microphone at a second end of the acoustic pathway; and using signals from the microphone to reproduce sound into an ear canal of a user of the ear-wearable device.

Example 18 includes the method of example 17, wherein the dividing member reduces an ultrasonic peak detected at the microphone and spreads acoustic energy across a wider frequency spectral range than the ultrasonic peak. Example 19 includes the method of example 18, wherein the ultrasonic peak is at or above 20 kHz. Example 20 includes the method of example 17, 18, or 19, wherein the dividing member reduces a sensitivity of the microphone to an ultrasonic field generated by external motion sensors.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g., 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The invention claimed is:

1. An ear-wearable device comprising:

a housing comprising a top shell and a bottom shell, a groove being defined at an interface of the top and bottom shells;

a microphone inlet acoustically coupling the groove with a first end of an acoustic pathway within the housing between the top and bottom shells, the microphone inlet defined by a top surface of the top shell, a bottom surface of the bottom shell, and an opening in at least one of the top shell and the bottom shell;

a dividing member dividing the microphone inlet, a top surface of the dividing member being in contact with or connected to the top surface of the top shell, and at least part of a bottom surface of the dividing member being in contact with or connected to the bottom surface of the bottom shell; and a microphone at a second end of the acoustic pathway and acoustically coupled to the acoustic pathway.

2. The ear-wearable device of claim 1, wherein the dividing member breaks a uniform pressure front across the microphone inlet and provides a local pressure relief built on a first part of the microphone inlet to be released to a second part of the microphone inlet.

3. The ear-wearable device of claim 1, wherein the dividing member reduces an ultrasonic peak detected at the microphone and spreads acoustic energy across a wider frequency spectral range than the ultrasonic peak.

4. The ear-wearable device of claim 3, wherein the ultrasonic peak is at or above 20 kHz.

5. The ear-wearable device of claim 1, wherein the dividing member reduces a sensitivity of the microphone to an ultrasonic field generated by external motion sensors.

6. The ear-wearable device of claim 1, wherein a first part of the bottom surface of the dividing member is exposed within the acoustic pathway and a second part of the bottom surface of the dividing member is in contact with or connected to the bottom surface of the bottom shell.

7. The ear-wearable device of claim 1, wherein a distal end of the dividing member is exposed within the acoustic pathway.

8. The ear-wearable device of claim 1, wherein the first end of the acoustic pathway has a first dimension from the top shell to the bottom shell and the second end of the acoustic pathway has a second dimension from the top shell to the bottom shell, the first dimension being larger than the second dimension.

9. The ear-wearable device of claim 8, wherein the acoustic pathway tapers from the first dimension to the second dimension at a mid-point between the first end and the second end and wherein the acoustic pathway has a substantially constant cross sectional shape normal to its major axis from the mid-point to the second end.

10. The ear-wearable device of claim 9, wherein a distance from the mid-point to the first end of the acoustic pathway is between 40% and 60% of a total length of the acoustic pathway.

11. The ear-wearable device of claim 1, wherein the microphone inlet has an opening width along a minor axis of the acoustic pathway and the dividing member has a blocking width along the minor axis, the blocking width being between 20% and 40% of the opening width.

12. The ear-wearable device of claim 11, wherein the opening width is at least 0.004 inches and the blocking width is 0.001 inches or less.

13. The ear-wearable device of claim 1, wherein the acoustic pathway comprises a restriction in width along a minor axis of the acoustic pathway at the first end, the restriction proximate a distal end of the dividing member.

14. The ear-wearable device of claim 1, wherein the housing is configured to rest against a user's outer ear, the ear-wearable device further comprising a receiver portion configured for placement in an ear canal of the user.

15. The ear-wearable device of claim 1, wherein the dividing member divides the microphone inlet into equal portions.

16. The ear-wearable device of claim 1, wherein the microphone inlet comprises a front microphone inlet and the microphone comprises a front microphone, the ear-wearable device further comprising:

one or more rear microphone inlets acoustically coupling the groove with a first end of a rear acoustic pathway within the housing; and a rear microphone at a second end of the rear acoustic pathway and acoustically coupled to the rear acoustic pathway.

17. The ear-wearable device of claim 1, wherein the dividing member comprises a non-uniform cross section along a major axis of the acoustic pathway.

18. A method, comprising:

acoustically coupling, via a microphone inlet, air outside of a housing of an ear-wearable device with a first end of an acoustic pathway within the housing;

dividing the microphone inlet via a dividing member to break a uniform pressure front across the microphone inlet and provide a local pressure relief built on a first part of the microphone inlet to be released to a second part of the microphone inlet;

acoustically coupling a microphone at a second end of the acoustic pathway; and using signals from the microphone to reproduce sound into an ear canal of a user of the ear-wearable device;

wherein the dividing member reduces an ultrasonic peak detected at the microphone and spreads acoustic energy across a wider frequency spectral range than the ultrasonic peak.

19. The method of claim 18, wherein the ultrasonic peak is at or above 20 kHz.

20. The method of claim 18, wherein the dividing member reduces a sensitivity of the microphone to an ultrasonic field generated by external motion sensors.

* * * * *